US009077275B2

(12) United States Patent
Oyobe et al.

(10) Patent No.: US 9,077,275 B2
(45) Date of Patent: Jul. 7, 2015

(54) ROTOR POSITION ESTIMATING DEVICE, ELECTRIC MOTOR CONTROL SYSTEM AND ROTOR POSITION ESTIMATING METHOD

(71) Applicants: Hichirosai Oyobe, Toyota (JP); Takuya Nishimoto, Nagoya (JP); Hiroyuki Oyanagi, Toyota (JP)

(72) Inventors: Hichirosai Oyobe, Toyota (JP); Takuya Nishimoto, Nagoya (JP); Hiroyuki Oyanagi, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 137 days.

(21) Appl. No.: 13/960,209

(22) Filed: Aug. 6, 2013

(65) Prior Publication Data

US 2014/0062353 A1 Mar. 6, 2014

(30) Foreign Application Priority Data

Aug. 29, 2012 (JP) ................................. 2012-188577

(51) Int. Cl.
| | |
|---|---|
| H02P 6/14 | (2006.01) |
| H02P 21/00 | (2006.01) |
| H02P 27/08 | (2006.01) |
| H02P 21/04 | (2006.01) |
| H02P 21/14 | (2006.01) |

(52) U.S. Cl.
CPC ........ *H02P 21/0096* (2013.01); *H02P 2209/13* (2013.01); *H02P 27/085* (2013.01); *H02P 21/0035* (2013.01); *H02P 21/04* (2013.01); *H02P 21/146* (2013.01); *H02P 2201/07* (2013.01)

(58) Field of Classification Search
CPC .............................. H02P 21/146; H02P 6/183
USPC ........................................ 318/400.02, 400.07
See application file for complete search history.

(56) References Cited

U.S. PATENT DOCUMENTS

| | | | |
|---|---|---|---|
| 5,994,870 A | 11/1999 | Kaneko et al. | |
| 8,674,638 B2* | 3/2014 | Balazovic et al. | 318/400.33 |
| 2010/0052581 A1 | 3/2010 | Izumi et al. | |
| 2011/0040519 A1* | 2/2011 | Yeh et al. | 702/145 |
| 2013/0271048 A1* | 10/2013 | Iwashita et al. | 318/400.02 |

FOREIGN PATENT DOCUMENTS

| | | |
|---|---|---|
| JP | A-07-245981 | 9/1995 |
| JP | A-10-229699 | 8/1998 |
| JP | A-2003-180094 | 6/2003 |
| JP | A-2007-124836 | 5/2007 |
| JP | A-2010-035351 | 2/2010 |

(Continued)

*Primary Examiner* — Erick Glass
(74) *Attorney, Agent, or Firm* — Oliff PLC

(57) ABSTRACT

A rotor position estimating device includes a voltage application unit, a current detecting unit and an estimating unit. The voltage application unit is configured to apply a d-axis voltage to an electric motor including a salient-pole rotor during a stop of the electric motor. The current detecting unit is configured to detect a q-axis current flowing through the electric motor at the time when the d-axis voltage is applied. The estimating unit is configured to estimate a rotor position during a stop of the electric motor on the basis of the q-axis current detected by the current detecting unit. The voltage application unit is configured to set a voltage application time in correspondence with peak timing at which the q-axis current reaches a peak in a transitional response characteristic of the q-axis current at the time when the d-axis voltage is applied.

9 Claims, 6 Drawing Sheets

(56) References Cited

FOREIGN PATENT DOCUMENTS

| | | |
|---|---|---|
| JP | A-2010-035352 | 2/2010 |
| JP | A-2010-035353 | 2/2010 |
| JP | A-2010-57228 | 3/2010 |
| JP | A-2011-078295 | 4/2011 |

* cited by examiner

US 9,077,275 B2

ROTOR POSITION ESTIMATING DEVICE, ELECTRIC MOTOR CONTROL SYSTEM AND ROTOR POSITION ESTIMATING METHOD

INCORPORATION BY REFERENCE

The disclosure of Japanese Patent Application No. 2012-188577 filed on Aug. 29, 2012 including the specification, drawings and abstract is incorporated herein by reference in its entirety.

BACKGROUND OF THE INVENTION

1. Field of the Invention

The invention relates to a rotor position estimating device, electric motor control system and rotor position estimating method that estimate a rotor position of an electric motor including a salient-pole rotor.

2. Description of Related Art

In an electromotive vehicle (such as an electric vehicle and a hybrid vehicle) on which an alternating-current motor is mounted as a power source of the vehicle, a synchronous motor, such as a permanent magnet-type synchronous motor that uses a permanent magnet for a rotor, is used as the alternating-current motor. In addition, energization control over the synchronous motor is executed on the basis of information about the position of the rotor. In the energization control over the synchronous motor, currents that are respectively supplied to coils of respective phases of the synchronous motor are controlled on the basis of the information about the position of the rotor. Therefore, usually, a rotation position sensor, such as a resolver, that detects a rotor position is used.

However, as described above, with the configuration that detects the rotor position with the use of the rotation position sensor, there occurs an offset error due to an error in the mounting position of the rotation position sensor, and a rotor position that is detected by the rotation position sensor deviates from an actual rotor position. As a result, the accuracy of energization control over the synchronous motor may be decreased. Thus, it is required to estimate an actual rotor position of the synchronous motor and then to detect an offset error of the rotation position sensor on the basis of the estimated actual rotor position.

As a technique for estimating the rotor position of the synchronous motor, for example, Japanese Patent Application Publication No. 7-245981 (JP 7-245981 A) describes a magnetic pole position detecting device for an electric motor. The magnetic pole position detecting device detects electric motor currents at the time of applying alternating-current voltages to the electric motor with the use of a current detector and then estimates magnetic pole positions (rotor position) of the electric motor on the basis of the detected values of the current detector. According to JP 7-245981 A, the detected electric motor currents are separated into a parallel component and a perpendicular component with respect to the alternating-current voltages applied, and the magnetic pole positions of the electric motor are detected on the basis of at least one of the parallel component and perpendicular component of the electric motor currents.

In JP 7-245981 A, the detected values of the current detector are converted to a current vector, and the rotor position is estimated on the basis of the converted current vector. Therefore, when there is a deviation in the detected values of the current detector with respect to actual electric motor current values (actual current values), it is difficult to estimate an accurate rotor position. Thus, the accuracy of energization control over the synchronous motor may decrease.

SUMMARY OF THE INVENTION

The invention provides a rotor position estimating device, electric motor control system and rotor position estimating method that accurately estimate a rotor position of an electric motor without the influence of an error of a current detector that detects currents flowing through the electric motor.

A rotor position estimating device according to a first aspect of the invention includes a voltage application unit, a current detecting unit and an estimating unit. The voltage application unit is configured to apply a d-axis voltage to an electric motor including a salient-pole rotor during a stop of the electric motor. The current detecting unit is configured to detect a q-axis current flowing through the electric motor at the time when the d-axis voltage is applied. The estimating unit is configured to estimate a rotor position during a stop of the electric motor on the basis of the q-axis current detected by the current detecting unit. The voltage application unit is configured to set a voltage application time in correspondence with peak timing at which the q-axis current reaches a peak in a transitional response characteristic of the q-axis current at the time when the d-axis voltage is applied.

In the first aspect of the invention, the voltage application unit may be configured to set the voltage application time such that the peak timing becomes timing at which the voltage application time ends. Also, the current detecting unit may be configured to detect the q-axis current at the timing at which the voltage application time ends.

In the first aspect of the invention, the voltage application unit may be configured to apply the d-axis voltage at each of rotation angles of d-q axes set as a rotating coordinate system of the electric motor while the d-q axes are being rotated at intervals of predetermined angle. Also, the estimating unit may be configured to estimate a rotor position corresponding to the d-q axes, at which a detected value of the q-axis current at the time when the d-axis voltage is applied at each of the rotation angles is closest to zero, as the rotor position during a stop of the electric motor.

In the first aspect of the invention, the rotor position estimating device may further include an inverter and an adjustment unit. The inverter is configured to control a voltage that is applied to the electric motor through switching operation in accordance with a control signal that is generated on the basis of a command value and a carrier wave. The adjustment unit is configured to adjust a frequency of the carrier wave such that the voltage application time becomes a time that is the integral multiple of half of a period of the carrier wave. Also the voltage application unit may be configured to control switching operation of the inverter such that application of the d-axis voltage to the electric motor is started at timing at which the carrier wave reaches a vertex. Furthermore, the current detecting unit may be configured to detect the q-axis current by sampling the q-axis current at the timing at which the carrier wave reaches a vertex.

An electric motor control system according to a second aspect of the invention is a system that controls an electric motor including a salient-pole rotor. The electric motor control system includes a rotation position detecting device, a rotor position estimating device, an error detecting device, a correcting device and an energization control device. The rotation position detecting device is configured to detect a rotor position of the electric motor. The rotor position estimating device is configured to estimate the rotor position of the electric motor during a stop of the electric motor. The error detecting device is configured to detect an error between a detected value of the rotor position and an estimated value of the rotor position. The detected value is detected by the rotation position detecting device. The estimated value of the rotor position is estimated by the rotor position estimating device. The correcting device is configured to correct the rotor position that is detected by the rotation position detecting device using the error detected by the error detecting device. The energization control device is configured to execute energization control over the electric motor on the basis of the rotor position corrected by the correcting device. The rotor position estimating device includes a voltage application unit configured to apply a d-axis voltage to the electric motor during a stop of the electric motor, a current detecting unit configured to detect a q-axis current flowing through the electric motor at the time when the d-axis voltage is applied and an estimating unit configured to estimate the rotor position during a stop of the electric motor on the basis of the q-axis current detected by the current detecting unit. The voltage application unit is configured to set a voltage application time in correspondence with peak timing at which the q-axis current reaches a peak in a transitional response characteristic of the q-axis current at the time when the d-axis voltage is applied.

A rotor position estimating method according to a third aspect of the invention includes: applying a d-axis voltage to an electric motor including a salient-pole rotor during a stop of the electric motor; detecting a q-axis current flowing through the electric motor at the time when the d-axis voltage is applied; and estimating a rotor position during a stop of the electric motor on the basis of the detected q-axis current. A voltage application time is set in correspondence with peak timing at which the q-axis current reaches a peak in a transitional response characteristic of the q-axis current at the time when the d-axis voltage is applied.

In the third aspect of the invention, the voltage application time may be set such that the peak timing becomes timing at which the voltage application time ends. Also, the q-axis current may be detected at the timing at which the voltage application time ends.

In the third aspect of the invention, the d-axis voltage may be applied at each of rotation angles of d-q axes set as a rotating coordinate system of the electric motor while the d-q axes are being rotated at intervals of predetermined angle. Also, a rotor position corresponding to the d-q axes, at which a detected value of the q-axis current at the time when the d-axis voltage is applied at each of the rotation angles is closest to zero, may be estimated as the rotor position during a stop of the electric motor.

In the third aspect of the invention, the rotor position estimating method may further include controlling a voltage that is applied to the electric motor through switching control over an inverter in accordance with a control signal that is generated on the basis of a command value and a carrier wave. The inverter may be subjected to switching control such that application of the d-axis voltage to the electric motor is started at timing at which the carrier wave reaches a vertex. Also, the q-axis current may be detected by sampling the q-axis current at the timing at which the carrier wave reaches a vertex. Furthermore, the frequency of the carrier wave may be adjusted such that the voltage application time becomes a time that is the integral multiple of half of a period of the carrier wave.

According to the first to third aspects of the invention, it is possible to accurately estimate the rotor position of the electric motor including the salient-pole rotor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
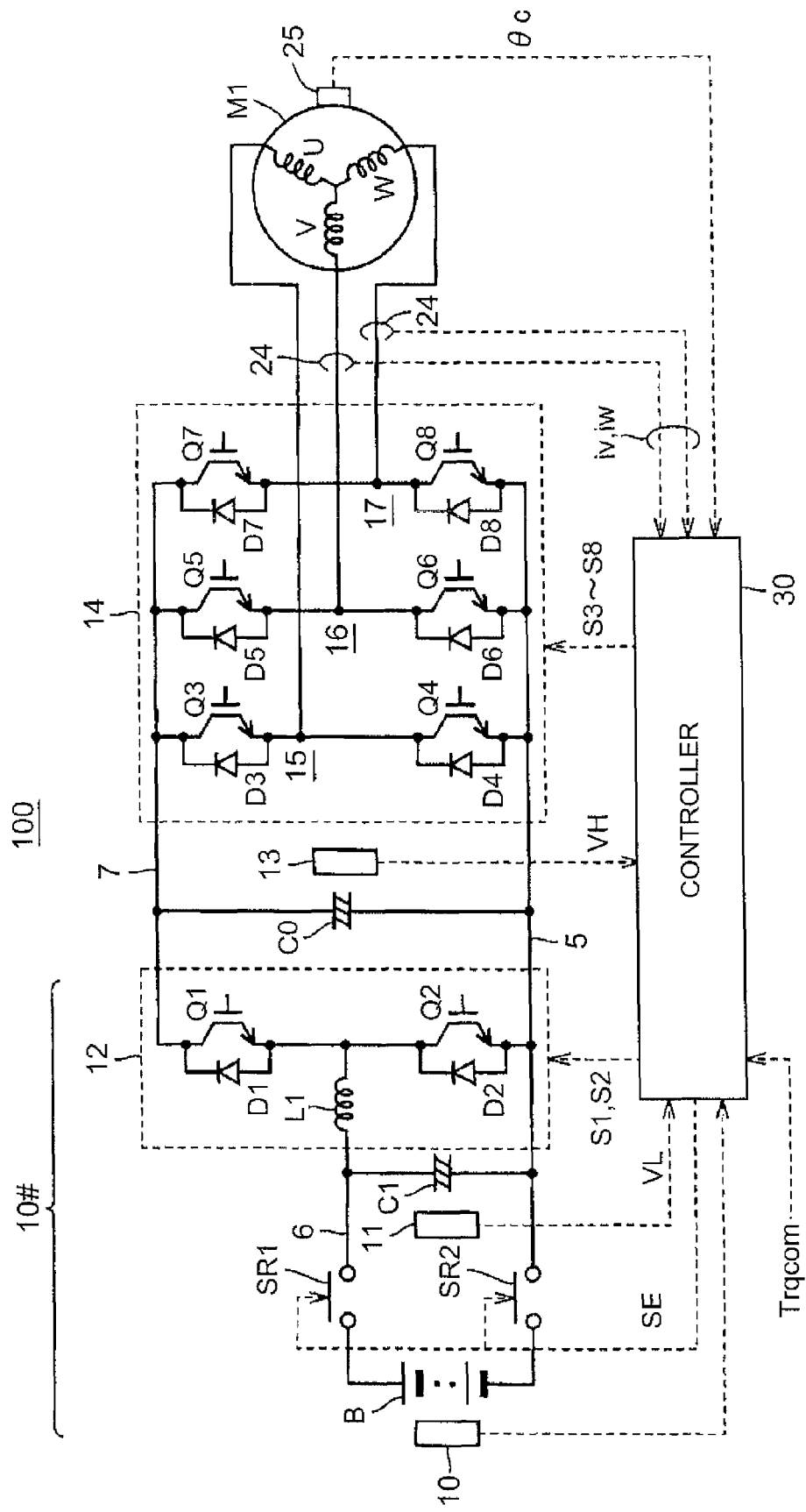
FIG. 1 is a schematic configuration view of an electric motor control system to which a rotor position estimating device according to an embodiment of the invention is applied.

Hereinafter, an embodiment of the invention will be described in detail with reference to the accompanying drawings. Hereinafter, like reference numerals denote the same or corresponding portions in the drawings, and the description thereof is basically not repeated.

FIG. 1 is a schematic configuration view of an electric motor control system to which a rotor position estimating device according to the embodiment of the invention is applied.

The electric motor control system 100 includes a direct-current voltage generating unit 10#, a smoothing capacitor C0, an inverter 14, a controller 30 and an alternating-current motor M1.

The alternating-current motor M1 is a synchronous motor including a salient-pole rotor. For example, a permanent magnet-type synchronous motor that uses a permanent magnet as a rotor is used as the alternating-current motor M1.

In the present embodiment, the alternating-current motor M1 is a driving electric motor that generates torque for driving a drive wheel of an electromotive vehicle, such as a hybrid vehicle and an electric vehicle. The electromotive vehicle includes overall vehicles on which an electric motor for generating vehicle driving force is mounted, including an electric vehicle on which no engine is mounted. The alternating-current motor M1 is generally configured to have both the function of an electric motor and the function of a generator. In addition, the alternating-current motor M1 may be configured to have the function of a generator that is driven by an engine in a hybrid vehicle. Furthermore, the alternating-current motor M1 may operate as an electric motor for an engine. For example, the alternating-current motor M1 may be assembled in a hybrid vehicle so as to be able to start the engine.

The direct-current voltage generating unit 10# includes a direct-current power supply B, system relays SR1, SR2, a smoothing capacitor C1 and a converter 12.

The direct-current power supply B is constituted by a secondary battery, such as a nickel metal hydride battery and a lithium ion battery, a fuel cell, an electric double layer capacitor or a combination of them. A sensor 10 provided at the direct-current power supply B detects the voltage (Vb), current and temperature of the direct-current power supply B. Detected values of the sensor 10 are output to the controller 30.

The system relay SR1 is connected between the positive electrode terminal of the direct-current power supply B and a power line 6, and the system relay SR2 is connected between the negative electrode terminal of the direct-current power supply B and a power line 5. The system relays SR1, SR2 are turned on or off by a signal SE from the controller 30. The smoothing capacitor C1 is connected between the power line 6 and the power line 5. A direct-current voltage VL between the power line 6 and the power line 5 is detected by a voltage sensor 11. A detected value of the voltage sensor 11 is transmitted to the controller 30.

The converter 12 includes a reactor L1, power semiconductor switching elements Q1, Q2, and diodes D1, D2.

The power semiconductor switching elements Q1, Q2 are serially connected between the power line 7 and the power line 5. On/off states of the power semiconductor switching elements Q1, Q2 are controlled by switching control signals S1, S2 from the controller 30.

In the embodiment of the invention, each of the power semiconductor switching elements (hereinafter, simply referred to as "switching elements") may be an insulated gate bipolar transistor (IGBT), a power metal oxide semiconductor (MOS) transistor, a power bipolar transistor, or the like. The antiparallel diodes D1, D2 are respectively connected to the switching elements Q1, Q2.

The reactor L1 is connected between a connection node of the switching elements Q1, Q2 and the power line 6. In addition, the smoothing capacitor C0 is connected between the power line 7 and the power line 5.

The inverter 14 is constituted by a U-phase arm 15, a V-phase arm 16 and a W-phase arm 17 that are provided in parallel between the power line 7 and the power line 5. The arm of each phase is constituted by switching elements serially connected between the power line 7 and the power line 5. For example, the U-phase arm 15 includes switching elements Q3, Q4. The V-phase arm 16 includes switching elements Q5, Q6. The W-phase arm 17 includes switching elements Q7, Q8. Antiparallel diodes D3 to D8 are respectively connected to the switching elements Q3 to Q8. On/off states of the switching elements Q3 to Q8 are controlled by switching control signals S3 to S8 from the controller 30.

A midpoint of the arm of each phase is connected to the end of a corresponding one of the three-phase coils of the alternating-current motor M1. Typically, the alternating-current motor M1 is a three-phase permanent magnet motor, and is formed by commonly connecting one ends of the three U, V, W-phase coils to a neutral point. Furthermore, the other end of the coil of each phase is connected to the midpoint of the switching elements of a corresponding one of the three-phase arms 15 to 17.

The converter 12 is basically controlled such that the switching elements Q1, Q2 complementarily and alternately turn on or off within each switching period. At the time of step-up operation, the converter 12 steps up the direct-current voltage VL, which is supplied from the direct-current power supply B, to a direct-current voltage VH (which corresponds to an input voltage to the inverter 14, and, hereinafter, this direct-current voltage is also termed "system voltage"). The step-up operation is performed by supplying electromagnetic energy stored in the reactor L1 during an on period of the switching element Q2 to the power line 7 via the switching element Q1 and the antiparallel diode D1.

At the time of step-down operation, the converter 12 steps down the direct-current voltage VH to the direct-current voltage VL. The step-down operation is performed by supplying electromagnetic energy stored in the reactor L1 during an on period of the switching element Q1 to the power line 6 via the switching element Q2 and the antiparallel diode D2. A voltage conversion ratio (the ratio of VH and VL) in the step-up operation or the step-down operation is controlled by an on period ratio (duty ratio) of the switching element Q1 or the switching element Q2 with respect to the switching period. When the switching elements Q1, Q2 are respectively fixed to the on state and the off state, VH=VL (voltage conversion ratio=1.0) is obtained.

The smoothing capacitor C0 smoothes the direct-current voltage applied to the power line 7. The voltage sensor 13 detects the voltage between both ends of the smoothing capacitor C0, that is, the system voltage VH, and outputs the detected value to the controller 30.

When a torque command value of the alternating-current motor M1 is positive (Trqcom>0), the inverter 14 converts the direct-current voltage applied to the power line 7 to alternating-current voltages through switching operations of the switching elements Q3 to Q8 in response to the switching control signals S3 to S8 from the controller 30, and drives the alternating-current motor M1 such that the alternating-current motor M1 outputs a positive torque. When the torque command value of the alternating-current motor M1 is zero (Trqcom=0), the inverter 14 converts the direct-current voltage to alternating-current voltages through switching operations in response to the switching control signals S3 to S8, and drives the alternating-current motor M1 such that the torque becomes zero. Thus, the alternating-current motor M1 is driven so as to generate zero or positive torque specified by the torque command value Trqcom.

Furthermore, at the time of regenerative braking of the electromotive vehicle on which the electric motor control system 100 is mounted, the torque command value Trqcom of the alternating-current motor M1 is set to a negative value (Trqcom<0). In this case, the inverter 14 converts alternating-current voltages generated by the alternating-current motor M1 to direct-current voltage through switching operations in response to the switching control signals S3 to S8, and supplies the converted direct-current voltage (system voltage) to the converter 12 via the smoothing capacitor C0. Regenerative braking includes braking with regenerative power generation in the case where a foot brake operation is conducted by a driver who drives the electromotive vehicle and decelerating (or stop accelerating) the vehicle while performing regenerative power generation by releasing an accelerator pedal during travelling although the foot brake is not operated.

A current sensor 24 detects currents (phase currents) flowing through the alternating-current motor M1, and outputs the detected values to the controller 30. The sum of instantaneous values of three-phase currents iu, iv, iw is zero, so the current sensor 24 may be arranged so as to detect two-phase motor currents (for example, the V-phase current iv and the W-phase current iw) as shown in FIG. 1.

A rotation position sensor (resolver) 25 detects a rotor position (magnetic pole positions of the rotor) θc of the alternating-current motor M1, and transmits the detected rotor position θc to the controller 30. In the controller 30, it is possible to calculate the rotation speed and rotation angular velocity ω of the alternating-current motor M1 on the basis of the rotor position θc.

The controller 30 is constituted by an electronic control unit (ECU), and controls the operation of the electric motor control system 100 through software processing in which a prestored program is executed in a central processing unit (CPU) (not shown) and/or hardware processing of an exclusive electronic circuit.

As a typical function, the controller 30 controls the operations of the converter 12 and inverter 14 on the basis of the detected values of the sensor 10, the torque command value Trqcom, the direct-current voltage VL detected by the voltage sensor 11, the system voltage VH detected by the voltage sensor 13, the motor currents iv, iw that are detected by the current sensor 24, the rotor position θc from the rotation position sensor 25, and the like. That is, the controller 30 generates the switching control signals S1 to S8 for controlling the converter 12 and the inverter 14 as described above, and outputs the switching control signals S1 to S8 to the converter 12 and the inverter 14.

Specifically, the controller 30 executes feedback control over the system voltage VH, and generates the switching control signals S1, S2 such that the system voltage VH coincides with a voltage command value. In addition, the controller 30 generates the switching control signals S3 to S8 such that the alternating-current motor M1 outputs a torque according to the torque command value Trqcom through a control mode (described later), and outputs the switching control signals S3 to S8 to the inverter 14. Furthermore, the controller 30 controls on/off states of the system relays SR1, SR2 in response to a start or stop of the electric motor control system 100.

Next, power conversion in the inverter 14, which is controlled by the controller 30, will be described.

Figure 2:
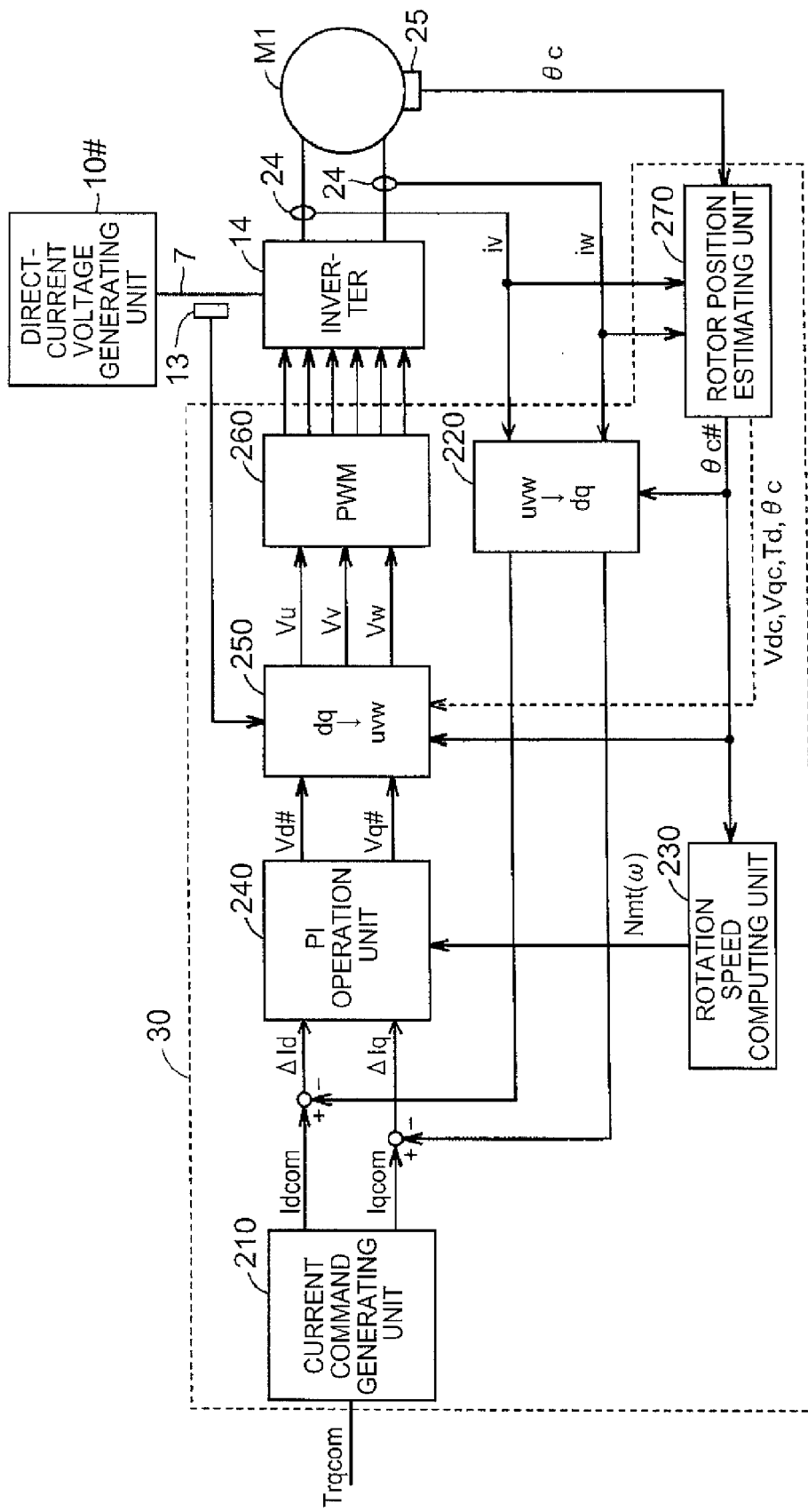
FIG. 2 is a functional block diagram of a pulse width modulation control mode that is executed by a controller.

FIG. 2 is a functional block diagram of a pulse width modulation (PWM) control mode that is executed by the controller 30. In the embodiment of the invention, sinusoidal PWM control that is a general PWM control mode is employed for power conversion in the inverter 14. The sinusoidal PWM control mode, an overmodulation PWM control mode and a rectangular wave voltage control may be switched and employed on the basis of the operating condition (typically, torque and rotation speed) of the alternating-current motor M1.

The controller 30 includes a current command generating unit 210, coordinate conversion units 220, 250, a rotation speed computing unit 230, a PI operation unit 240, a PWM signal generating unit 260 and a rotor position estimating unit 270. The rotor position estimating unit 270 serves as a rotor position estimating device of the invention.

The current command generating unit 210 generates a d-axis current command value Idcom and a q-axis current command value Iqcom based on the torque command value Trqcom in accordance with a prepared table, or the like.

The coordinate conversion unit 220 calculates a d-axis current Id and a q-axis current Iq on the basis of the V-phase current iv and the W-phase current iw detected by the current sensor 24 through coordinate conversion (three phases to two phases) using a rotor position θc# of the alternating-current motor M1. The rotor position θc# of the alternating-current motor M1 is output from the rotor position estimating unit 270 (described later). The rotation speed computing unit 230 computes a rotation speed Nmt (or rotation angular velocity ω) of the alternating-current motor M1 on the basis of the rotor position θc# from the rotor position estimating unit 270.

A deviation ΔId of the d-axis current from the command value (ΔId=Idcom−Id) and a deviation ΔIq of the q-axis current from the command value (ΔIq=Iqcom−Iq) are input to the PI operation unit 240. The PI operation unit 240 obtains a control deviation by performing PI operation on the d-axis current deviation ΔId and the q-axis current deviation ΔIq using a predetermined gain, and generates a d-axis voltage command value Vd# and a q-axis voltage command value Vq# based on the control deviation.

The coordinate conversion unit 250 converts the d-axis voltage command value Vd# and the q-axis voltage command value Vq# to U-phase, V-phase and W-phase voltage command values Vu, Vv, Vw through coordinate conversion (two phases to three phases) using the rotor position θc# of the alternating-current motor M1 from the rotor position estimating unit 270. The system voltage VH is also reflected in conversion from the d-axis and q-axis voltage command values Vd#, Vq# to the three-phase voltage command values Vu, Vv, Vw.

The PWM signal generating unit 260 generates the switching control signals S3 to S8 shown in FIG. 1 on the basis of a comparison between the three-phase voltage command values Vu, Vv, Vw and a predetermined carrier wave (carrier signal). The inverter 14 is subjected to switching control in accordance with the switching control signals S3 to S8 generated by the controller 30. Thus, alternating-current voltages for outputting a torque according to the torque command value Trqcom input to the current command generating unit 210 are applied.

In this way, a closed loop for controlling the motor currents to the current command values (Idcom, Iqcom) based on the torque command value Trqcom is configured, so the output torque of the alternating-current motor M1 is controlled in accordance with the torque command value Trqcom.

As described above, energization control over the alternating-current motor M1 is executed on the basis of the rotor position θc that is detected by the rotation position sensor 25. However, when there is an error in the mounting position of the rotation position sensor 25, this causes an offset error, and the output θc of the rotation position sensor 25 may deviate from an actual rotor position (hereinafter, also referred to as "actual rotor position"). As a result, the accuracy of energization control over the alternating-current motor M1 decreases, so it may be difficult to output the torque according to the torque command value Trqcom. Thus, it is required to obtain the offset error of the rotation position sensor 25 and then correct the output of the rotation position sensor 25 using the offset error.

In the present embodiment, the rotor position estimating unit 270 estimates an actual rotor position during a stop of the alternating-current motor M1 by utilizing a saliency of inductance. Then, the rotor position estimating unit 270 obtains the offset error that is a deviation of the output θc of the rotation position sensor 25 with respect to the actual rotor position.

Figure 3:
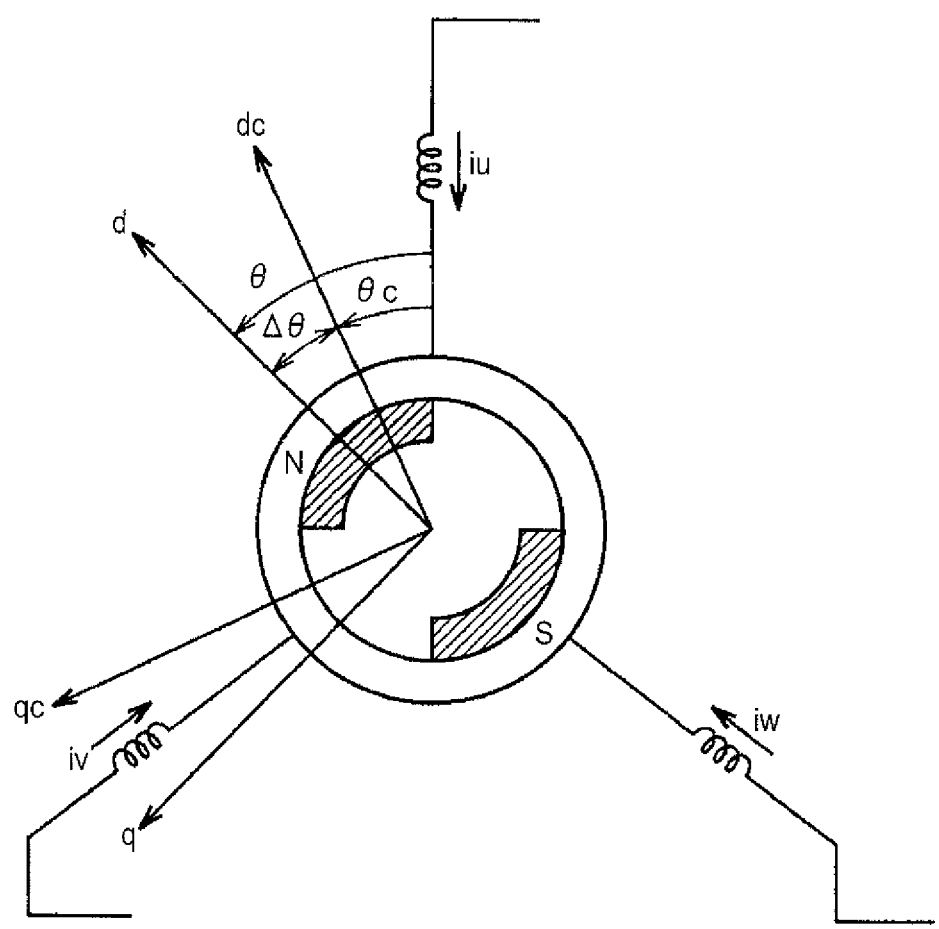
FIG. 3 is a view for illustrating an offset error of an alternating-current motor in a rotating coordinate system.

FIG. 3 is a view for illustrating the offset error of the alternating-current motor M1 in the rotating coordinate system. In control over the alternating-current motor M1, a rotating coordinate system having two axes, that is, a magnetic flux direction (d axis) of the permanent magnet of the rotor and a direction (q axis) perpendicular to the magnetic flux direction, is used. FIG. 3 shows a motor model on a rotating coordinate (d-q coordinate) system based on an actual rotor position θ. FIG. 3 further shows a rotating coordinate (dc-qc coordinate) system that is used in energization control over the alternating-current motor M1. The rotating coordinate system that is used in this control has a magnetic flux direction (dc axis) of the permanent magnet of the rotor, which is set on the basis of the output θc of the rotation position sensor 25, and a direction (qc axis) perpendicular to the magnetic flux direction. The dc-qc axes in the rotating coordinate (dc-qc coordinate) system that is used in this control are also termed "control axes" in the following description.

Here, when there is an error in the mounting position of the rotation position sensor 25, there occurs an offset error Δθ that is a deviation of the output θc of the rotation position sensor 25 from the actual rotor position θ. Thus, the control axes (dc-qc axes) each have the offset error Δθ with respect to the corresponding d-q axes based on the actual rotor position θ.

The rotor position estimating unit 270 estimates the actual rotor position θ during a stop of the alternating-current motor M1. Then, the offset error Δθ of the rotation position sensor 25 is calculated using the estimated actual rotor position θ. The rotor position estimating unit 270 corrects the rotor position θc that is detected by the rotation position sensor 25 using the calculated offset error Δθ, and outputs the corrected rotor position θc# to the coordinate conversion units 220, 250 and the rotation speed computing unit 230.

Hereinafter, estimation of the rotor position in the rotor position estimating unit 270 according to the present embodiment will be described in detail.

Referring back to FIG. 2, during a stop of the alternating-current motor M1, the rotor position estimating unit 270 applies predetermined pulsed voltages to dc-axes that are the control axes, and estimates the actual rotor position θ0 on the basis of the outputs of the current sensor 24 at the time when the pulsed voltages are applied.

Specifically, the d-axis voltage command value in the dc-qc coordinate system (control axes) used in energization control over the alternating-current motor M1 is set to a predetermined value Vd other than 0, and the q-axis voltage command value in the dc-qc coordinate system (control axes) is set to 0. That is, the d-axis voltage command value and the q-axis voltage command value are set such that a voltage vector is controlled to the dc axis in the dc-qc coordinate system. In the following description, as distinguished from the d-axis voltage command value Vd# and the q-axis voltage command value Vq# in energization control over the alternating-current motor M1, the d-axis voltage command value and the q-axis voltage command value for estimating the rotor position are also referred to as "d-axis voltage command value Vdc" and "q-axis voltage command value Vqc".

The coordinate conversion unit 250 receives, from the rotor position estimating unit 270, the d-axis voltage command value Vdc (=Vd) and the q-axis voltage command value Vqc (=0), the rotor position (rotor position during a stop of the alternating-current motor M1) θc detected by the rotation position sensor 25 and a d-axis voltage application time Td. The d-axis voltage application time Td corresponds to the pulse width of the predetermined pulsed voltage applied to the dc axis. In addition, the d-axis voltage command value Vdc corresponds to the pulse height of the pulsed voltage.

The coordinate conversion unit 250 converts the d-axis voltage command value Vdc and the q-axis voltage command value Vqc to the U-phase, V-phase and W-phase voltage command values Vu, Vv, Vw through coordinate conversion (two phases to three phases) that uses the rotor position θc detected by the rotation position sensor 25. The PWM signal generating unit 260 generates the switching control signals S3 to S8 on the basis of a comparison between the three-phase voltage command values Vu, Vv, Vw and the carrier signal. The inverter 14 is subjected to switching control in accordance with the switching control signals S3 to S8 generated by the controller 30. Thus, the predetermined pulsed voltage is applied to the dc axis of the alternating-current motor M1.

Here, as is generally known, voltage equations of the U phase, V phase and W phase in the permanent magnet-type synchronous motor are expressed by the following mathematical expression (1).

$$\begin{bmatrix} V_u \\ V_v \\ V_w \end{bmatrix} = R \begin{bmatrix} I_u \\ I_v \\ I_w \end{bmatrix} + \frac{d}{dt} \begin{bmatrix} \phi_u \\ \phi_v \\ \phi_w \end{bmatrix} \quad (1)$$

In the mathematical expression (1), R denotes an armature winding resistance, and φ denotes the number of armature flux linkages of the permanent magnet.

By treating the alternating-current motor M1 as a motor model on the rotating coordinate (d-q axes) system shown in FIG. 3, the voltage equations of the above-described mathematical expression (1) are converted to voltage equations on the d-q axes shown in the following mathematical expression (2).

$$\begin{bmatrix} V_d \\ V_q \end{bmatrix} = \begin{bmatrix} R + \frac{d}{dt}L_d & -\omega L_q \\ \omega L_d & R + \frac{d}{dt}L_q \end{bmatrix} \begin{bmatrix} I_d \\ I_q \end{bmatrix} + \begin{bmatrix} 0 \\ \omega \phi \end{bmatrix} \quad (2)$$

In the mathematical expression (2), ω denotes the electric angular velocity of the alternating-current motor M1, Ld denotes a d-axis inductance, and Lq denotes a q-axis inductance.

Furthermore, by converting the voltage equations on the d-q axes shown in the above-described mathematical expression (2) to voltage equations on the control axes (dc-qc axes) having the offset error Δθ with respect to the d-q axes, the voltage equations on the control axes (dc-qc axes) are expressed by the following mathematical expression (3).

$$\begin{bmatrix} V_d \\ V_q \end{bmatrix} = \begin{bmatrix} R - \omega L_{dqc} + \frac{d}{dt}L_{dc} & -\omega L_{qc} + \frac{d}{dt}L_{dqc} \\ \omega L_{dc} + \frac{d}{dt}L_{dqc} & R + \omega L_{dqc} + \frac{d}{dt}L_{qc} \end{bmatrix} \begin{bmatrix} I_{dc} \\ I_{qc} \end{bmatrix} + \omega \phi \begin{bmatrix} -\sin\Delta\theta \\ \cos\Delta\theta \end{bmatrix} \quad (3)$$

In the mathematical expression (3), Vdc, Vqc respectively denote the d-axis voltage and the q-axis voltage on the control axes (dc-qc axes), and Idc, Iqc respectively denote the d-axis current and the q-axis current on the control axes (dc-qc axes). That is, the mathematical expression (3) mathematizes the motor model on the control axes (dc-qc axes) on the basis of the output θc of the rotation position sensor 25.

Now the alternating-current motor M1 is stopped, so the electric angular velocity ω of the alternating-current motor M1 in the mathematical expression (3) is 0. Then, by solving the mathematical expression (3) with respect to the currents Idc, Iqc on the control axes (dc-qc axes), the following mathematical expressions (4), (5) are obtained.

$$I_{dc} = \frac{V_{dc}}{R} - \frac{V_{dc}}{2R}\left(e^{-\frac{R}{L_d}t} + e^{-\frac{R}{L_q}t}\right) - \frac{V_{dc}}{2R}\left(e^{-\frac{R}{L_d}t} + e^{-\frac{R}{L_q}t}\right)\cos2\Delta\theta - \frac{V_{qc}}{2R}\left(e^{-\frac{R}{L_d}t} + e^{-\frac{R}{L_q}t}\right)\sin2\Delta\theta \quad (4)$$

$$I_{qc} = \frac{V_{dc}}{2R}\left(e^{-\frac{R}{L_d}t} + e^{-\frac{R}{L_q}t}\right)\sin 2\Delta\theta + \frac{V_{qc}}{R} - \frac{V_{qc}}{2R}\left(e^{-\frac{R}{L_d}t} + e^{-\frac{R}{L_q}t}\right) + \frac{V_{qc}}{2R}\left(e^{-\frac{R}{L_d}t} + e^{-\frac{R}{L_q}t}\right)\cos 2\Delta\theta \quad (5)$$

The case where the offset error $\Delta\theta$ of the rotation position sensor 25 is 0, that is, the actual rotor position $\theta$ coincides with the output $\theta c$ of the rotation position sensor 25, in the current equations of the above-described mathematical expressions (4), (5) will be considered. In this case, in each mathematical expression, sin $2\Delta\theta=0$ and cos $2\Delta\theta=1$, so the mathematical expressions (4), (5) are respectively replaced with the following mathematical expressions (6), (7).

$$I_{dc} = \frac{V_{dc}}{R} - \frac{V_{dc}}{2R}\left(e^{-\frac{R}{L_d}t} + e^{-\frac{R}{L_q}t}\right) - \frac{V_{dc}}{2R}\left(e^{-\frac{R}{L_d}t} + e^{-\frac{R}{L_q}t}\right) \quad (6)$$

$$I_{qc} = \frac{V_{qc}}{R} - \frac{V_{qc}}{2R}\left(e^{-\frac{R}{L_d}t} + e^{-\frac{R}{L_q}t}\right) + \frac{V_{qc}}{2R}\left(e^{-\frac{R}{L_d}t} + e^{-\frac{R}{L_q}t}\right) \quad (7)$$

When the above-described d-axis voltage command value Vdc (=Vd) and q-axis voltage command value Vqc (=0) are applied to the d-axis voltage Vdc and the q-axis voltage Vqc in the above-described mathematical expressions (6), (7), the current equations on the control axes (dc-qc axes) become the following mathematical expressions (8), (9).

$$I_{dc} = \frac{V_{dc}}{R}\left(1 - e^{-\frac{R}{L_d}t}\right) \quad (8)$$

$$I_{qc} = 0 \quad (9)$$

As expressed by the above-described mathematical expressions (8), (9), when the predetermined pulsed voltage is applied to the dc axis that is one of the control axes during a stop of the alternating-current motor M1, in the case where the offset error $\Delta\theta$ of the rotation position sensor 25 is 0, the d-axis current Idc becomes a predetermined value other than 0; whereas the q-axis current Iqc becomes 0. That is, in the case where the offset error $\Delta\theta$ is 0, only the d-axis current Idc flows, and the q-axis current Iqc does not flow.

Thus, by obtaining the control axes at which the q-axis current Iqc becomes 0 when the predetermined pulsed voltage is applied to the dc axis, it is possible to estimate the rotor position $\theta c$ corresponding to the control axes as the actual rotor position $\theta$ during a stop of the alternating-current motor M1.

In the present embodiment, the rotor position estimating unit 270 rotates the control axes (dc-qc axes) based on the output $\theta c$ of the rotation position sensor 25 within a predetermined rotation angular range, and applies the predetermined pulsed voltage to the dc axis, which is one of the control axes, at each rotation angle. Then, the rotor position $\theta c$ corresponding to the control axes at the time when the q-axis current Iqc at the time of application of the predetermined pulsed voltage is closest to 0 is estimated as the actual rotor position $\theta c$.

Figure 4:
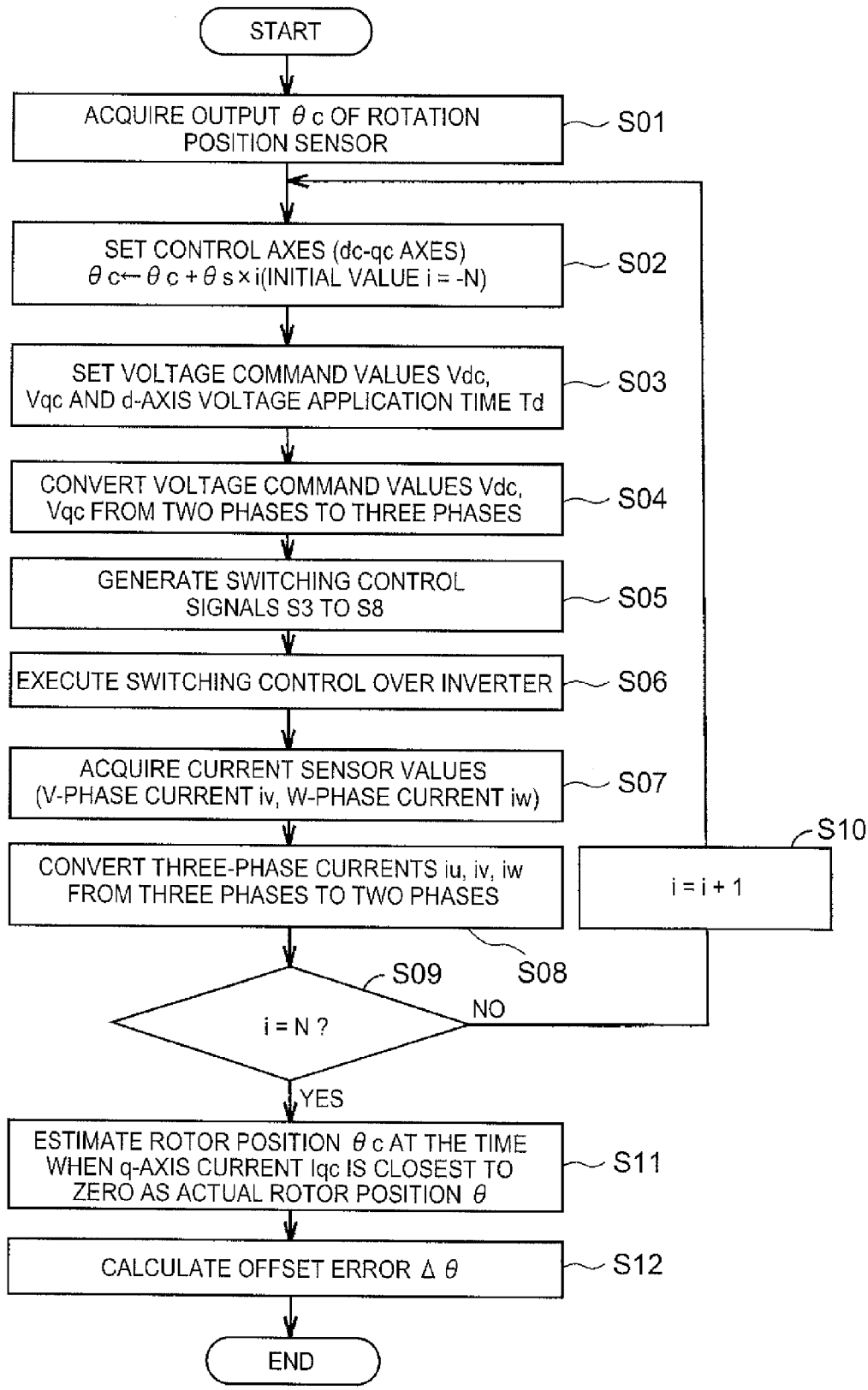
FIG. 4 is a flowchart that illustrates a control procedure for estimating a rotor position according to the embodiment of the invention.

FIG. 4 is a flowchart that illustrates a control procedure for estimating the rotor position according to the embodiment of the invention. The control process shown in FIG. 4 is executed by the controller 30 during a stop of the alternating-current motor M1. The control process of each step in FIG. 4 is implemented by a predetermined program that is executed by the controller 30 and/or control processing that is executed by an electronic circuit (hardware) in the controller 30.

In step S01, the controller 30 acquires the rotor position $\theta c$ detected by the rotation position sensor 25 during a stop of the alternating-current motor M1.

In step S02, the controller 30 sets the control axes (dc-qc axes) on the basis of the output $\theta c$ of the rotation position sensor 25, acquired in step S01. Specifically, the controller 30 changes the output $\theta c$ of the rotation position sensor 25 by a predetermined angle $\theta s$ at each execution interval of step S02 to step S10 in FIG. 4. Thus, the control axes are rotated by the predetermined angle $\theta s$ at each execution interval. A rotation angular range of each control axis is set so as to have a width of product of $\pm\theta s \times N$ (N is a natural number) with respect to the output $\theta c$ of the rotation position sensor 25. As an example, the controller 30 changes the output $\theta c$ of the rotation position sensor 25 such that an initial value ($\theta c - \theta s \times N$) is increased by the predetermined angles $\theta s$.

In step S03, the controller 30 sets the d-axis voltage command value Vdc and the q-axis voltage command value Vqc such that the predetermined pulsed voltage is applied to the dc axis that is one of the control axes. As described above, the controller 30 sets the d-axis voltage command value Vdc corresponding to the pulse height of the predetermined pulsed voltage to the predetermined value Vd other than 0, and sets the d-axis voltage application time Td corresponding to the pulse width of the pulsed voltage. In addition, the controller 30 sets the q-axis voltage command value Vqc to 0.

Figure 5:
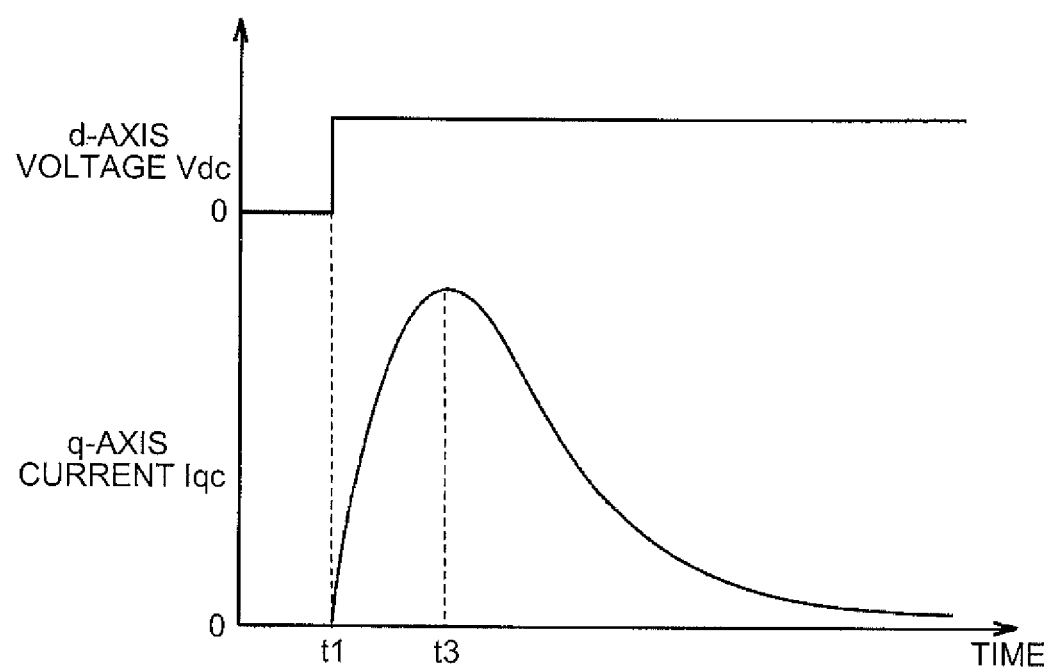
FIG. 5 is an output waveform chart of a d-axis voltage that is applied to the alternating-current motor and a q-axis current flowing through the alternating-current motor.

FIG. 5 shows an output waveform of the d-axis voltage Vdc that is applied to the alternating-current motor M1 and the q-axis current Iqc flowing though the alternating-current motor M1.

When the offset error $\Delta\theta$ of the rotation position sensor 25 is not 0, the q-axis current Iqc at the time when a constant voltage Vdc is applied to the dc axis is expressed by the above-described mathematical expression (7), and shows a transitional response characteristic shown in FIG. 5. That is, when the d-axis voltage Vdc is applied (time t1), the q-axis current Iqc increases with a delay corresponding to the inductances Ld, Lq with respect to the d-axis voltage, and, after reaching a peak at time t3, gently reduces.

Figure 6:
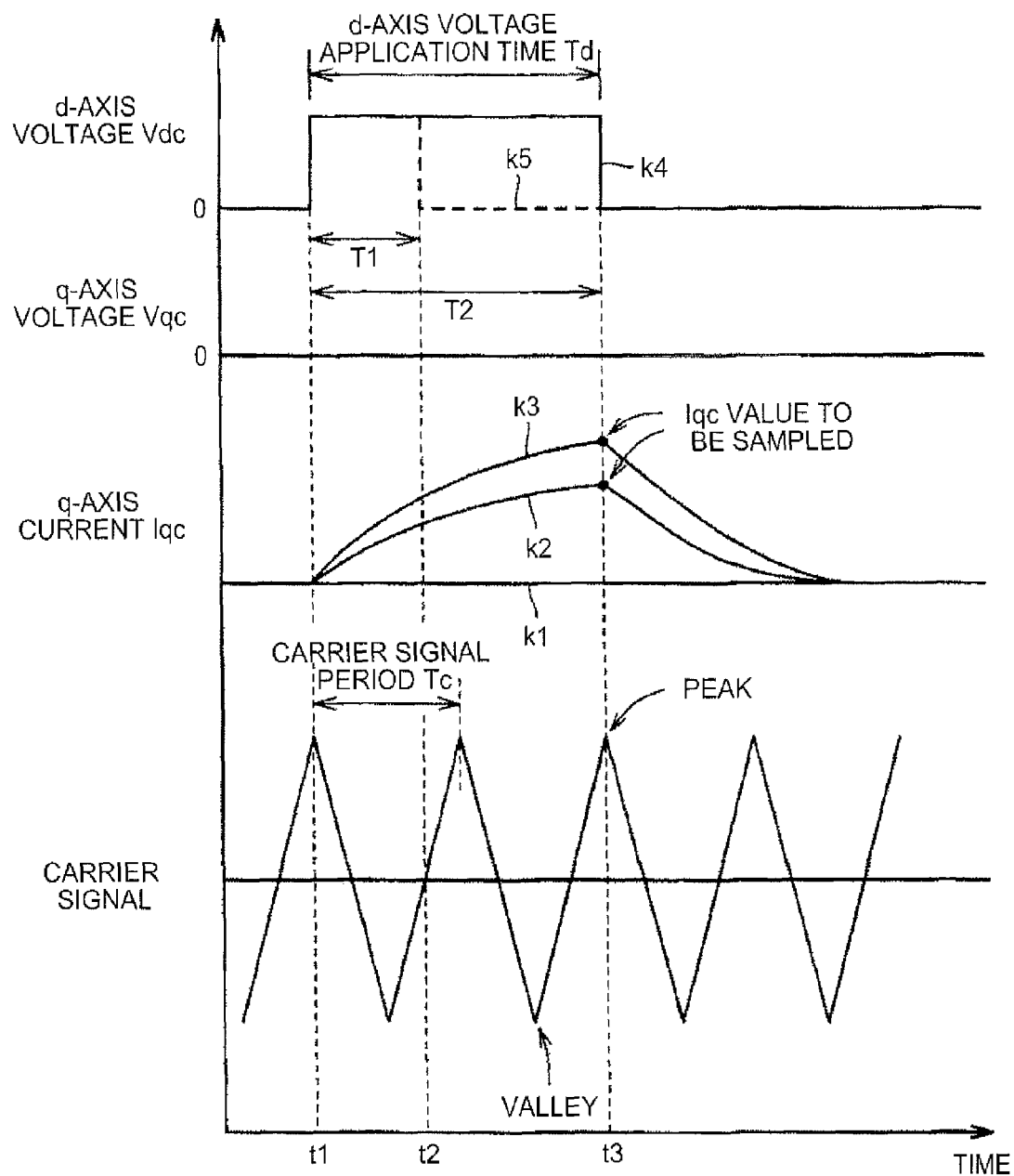
FIG. 6 is an output waveform chart that shows a variation in q-axis current at the time of applying the d-axis voltage in magnified view.

FIG. 6 is an output waveform chart that shows a variation in the q-axis current Iqc at the time of application of the d-axis voltage in magnified view.

By referring to FIG. 6, when the constant voltage Vdc is applied to the dc axis, the q-axis current Iqc exhibits a different output waveform on the basis of the offset error $\Delta\theta$ of the rotation position sensor 25. More specifically, in the case where the offset error $\Delta\theta$ is 0, the q-axis current Iqc is 0 (waveform k1 in the chart). In contrast to this, in the case where the offset error $\Delta\theta$ is not 0, the q-axis current Iqc exhibits a transitional response characteristic shown in waveforms k2, k3 in the chart. More specifically, in the case where the offset error $\Delta\theta$ is not 0, the q-axis current Iqc increases with an increase in the offset error $\Delta\theta$. In FIG. 6, the q-axis current Iqc shown by the waveform k3 has a larger offset error $\Delta\theta$ than the q-axis current Iqc shown by the waveform k2.

Here, by rotating the control axes in the predetermined angles $\theta s$ in step S02 in FIG. 4, the offset error $\Delta\theta$ varies in the predetermined angles $\theta s$. As the offset error $\Delta\theta$ varies, the q-axis current Iqc varies. The rotor position estimating unit 270 obtains the control axes at the time when the q-axis current Iqc becomes closest to 0 by detecting a variation in the q-axis current Iqc.

Specifically, the rotor position estimating unit 270 calculates the d-axis current Idc and the q-axis current Iqc on the basis of the V-phase current iv and the W-phase current iw detected by the current sensor 24 through coordinate conversion (three phases to two phases) using the rotor position θc that is output from the rotation position sensor 25.

However, when there is an error between the detected current values of the current sensor 24 and the actual current values, it is not possible to accurately detect the above-described variation in the q-axis current Iqc, so the accuracy of estimating the rotor position may be decreased. Thus, in order to ensure the accuracy of estimating the rotor position, it is required to reduce the influence of the error of the current sensor 24.

Thus, in estimating the rotor position according to the present embodiment, the pulse width (d-axis voltage application time Td) of the pulsed voltage that is applied to the dc axis is set to a value suitable to reduce the influence of the error of the current sensor 24 on the basis of the transitional response characteristic of the q-axis current Iqc shown in FIG. 5.

More specifically, by referring to FIG. 6, as shown by the waveform k5 in the chart, when the end timing of the d-axis voltage application time Td is set to time t2 before time t3 at which the q-axis current Iqc reaches a peak (Td=T1), the q-axis current Iqc at time t2 is smaller than a peak value. In this case, a variation in the q-axis current Iqc with respect to a variation in the offset error Δθ also reduces, so this easily receives the influence of the error of the current sensor 24.

In contrast to this, as shown by the waveform k4 in the chart, when the end timing of the d-axis voltage application time Td is set to time t3 at which the q-axis current Iqc reaches a peak (Td=T2), a variation in the q-axis current Iqc with respect to a variation in the offset error Δθ increases. Thus, the influence of the error of the current sensor 24 is reduced.

Therefore, the rotor position estimating unit 270 sets the d-axis voltage application time Td in correspondence with the timing at which the q-axis current Iqc reaches a peak in the transitional response characteristic of the q-axis current Iqc. Specifically, the d-axis voltage application time Td is set such that the timing (time t3) at which the q-axis current Iqc reaches a peak becomes the end timing of the d-axis voltage application time Td. Then, the rotor position estimating unit 270 calculates the q-axis current Iqc on the basis of the outputs of the current sensor 24 at the timing (time t3) at which the q-axis current Iqc reaches a peak. Thus, it is possible to suppress a decrease in the accuracy of estimating the rotor position due to the influence of the error of the current sensor 24.

In the present embodiment, in order to effectively reduce the error of the current sensor 24, the timing at which the q-axis current Iqc reaches a peak is set to the end timing of the d-axis voltage application time Td. However, it is allowed to provide a width of time for the end timing with respect to the timing at which the q-axis current Iqc reaches a peak as an effective range to reduce the error of the current sensor 24.

Referring back to FIG. 4, in step S04, the controller 30 converts the d-axis voltage command value Vdc and the q-axis voltage command value Vqc set in step S03 to the U-phase, V-phase and W-phase voltage command values Vu, Vv, Vw through coordinate conversion (two phases to three phases) using the rotor position θc from the rotation position sensor 25.

In step S05, the controller 30 generates the switching control signals S3 to S8 on the basis of a comparison between the three-phase voltage command values Vu, Vv, Vw and the carrier signal. In step S06, the inverter 14 is subjected to switching control in accordance with the switching control signals S3 to S8 generated by the controller 30. Thus, the predetermined pulsed voltage is applied to the dc axis that is one of the control axes.

The current sensor 24 detects currents (V-phase current iv and W-phase current iw) flowing through the alternating-current motor M1 at the time when the predetermined pulsed voltage is applied to the dc axis, which is one of the control axes, in step S06. When the controller 30 acquires the detected values of the current sensor 24 in step S07, the controller 30 calculates the d-axis current Idc and the q-axis current Iqc, on the basis of the V-phase current iv and the W-phase current iw detected by the current sensor 24 at the end timing of the d-axis voltage application time, through coordinate conversion (three phases to two phases) using the rotor position θc in step S08. As described above, the rotor position θc is output from the rotation position sensor 25. The controller 30 holds the calculated q-axis current Iqc in an internal memory.

Subsequently, in step S09, the controller 30 determines whether the output θc of the rotation position sensor 25 has reached a final value (θc+θs×N) within the predetermined rotation angular range. When the output θc of the rotation position sensor 25 has not reached the final value (at the time of negative determination in step S09), the controller 30 proceeds with the process to step S10, and increases the output θc of the rotation position sensor 25 by the predetermined angle θs, after which the controller 30 returns the process to step S02.

In contrast to this, when the output θc of the rotation position sensor 25 has reached the final value (at the time of affirmative determination in step S09), the controller 30 selects the q-axis current Iqc closest to 0 among the plurality of q-axis currents Iqc that are held in the internal memory and obtains the control axis corresponding to the selected q-axis current Iqc in step S11. Then, the controller 30 estimates the rotor position θc corresponding to this control axis as the actual rotor position θ.

When the actual rotor position θ during a stop of the alternating-current motor M1 is estimated, the controller 30 calculates the offset error Δθ of the rotation position sensor 25 using the estimated actual rotor position θ in step S12. The controller 30 holds the calculated offset error Δθ in the internal memory.

When the offset error Δθ of the rotation position sensor 25 is calculated in this way, the controller 30 corrects the rotor position θc that is detected by the rotation position sensor 25 using the offset error Δθ during operation of the alternating-current motor M1. Then, the corrected rotor position θc# is output to the coordinate conversion units 220, 250 and the rotation speed computing unit 230.

In this way, with the rotor position estimating device according to the embodiment of the invention, the influence of the error of the current sensor 24 is reduced in the configuration that estimates the actual rotor position on the basis of the outputs of the current sensor 24 at the time when the predetermined pulsed voltage is applied to the dc axis during a stop of the alternating-current motor M1, so it is possible to improve the accuracy of estimating the rotor position.

As described above, in each of normal energization control over the alternating-current motor M1 and estimation of the rotor position of the alternating-current motor M1, the controller 30 generates the switching control signals S3 to S8 on the basis of a comparison between the voltage command values Vu, Vv, Vw and the carrier signal and executes switching control over the inverter 14 using the generated switching control signals S3 to S8.

By referring to FIG. 5, at the time of estimating the rotor position of the alternating-current motor M1, the controller 30 starts applying voltages to the control axes (dc-qc axes) at the timing (time t1) at which the carrier signal formed of a triangular wave reaches a vertex (peak or valley). Then, the controller 30 acquires currents (phase currents) of the alternating-current motor M1, which are detected by the current sensor 24 at the end timing of the d-axis voltage application time Td (time t3).

On the other hand, the current sensor 24 is configured to sample phase currents flowing through the alternating-current motor M1 at the sampling timing specified by the controller 30 and to output the results to the controller 30. The sampling timing of the phase currents at this time is specified to the timing at which the carrier signal reaches a vertex (peak or valley).

Here, when the sampling timing of the current sensor 24 deviates from the end timing of the d-axis voltage application time Td (time t3), the q-axis current Iqc that is calculated on the basis of the outputs of the current sensor 24 becomes smaller than a value at time t3. Therefore, the error of the current sensor 24 may not be sufficiently reduced.

Therefore, in an alternative embodiment, as shown in FIG. 5, the frequency of the carrier signal (hereinafter, referred to as "carrier frequency") is adjusted such that the end timing of the d-axis voltage application time Td (time t3) coincides with the sampling timing of the current sensor 24. Specifically, the carrier frequency is adjusted such that the d-axis voltage application time Td is equal to a period of time that is the integral multiple of a period of time (=Tc/2) that is half the period Tc of the carrier signal.

In switching control over the inverter 14, normally, a dead time is set to each of the switching control signals S3 to S8 generated by the PWM signal generating unit 260. The dead time is a period during which the two serially connected switching elements are in an off state at the same time. By setting the dead time, a short circuit due to instantaneous simultaneous on states of the two switching elements is prevented. On the other hand, it is known that the influence of the dead time on the output voltage of the inverter 14 varies depending on the polarity of each phase current. Therefore, the carrier frequency is set to a frequency that is optimal to reduce the influence of the dead time.

In the alternative embodiment, the carrier frequency set as described above is minutely adjusted on the basis of the d-axis voltage application time Td. Thus, it is possible to improve the accuracy of estimating the rotor position while reducing the influence of the dead time.

In the above-described embodiment, the electric motor control system configured to execute energization control over the alternating-current motor on the basis of the rotor position that is detected by the rotation position sensor is described as the electric motor control system to which the rotor position estimating device according to the invention is applied. However, application of the invention is not limited to such an electric motor control system. Specifically, the invention may also be applied to an electric motor control system that employs a so-called sensorless control mode, which executes energization control by estimating a rotor position without using a rotation position sensor.

The embodiment described above is illustrative and not restrictive in all respects. The scope of the invention encompasses not only the above description but also all modifications within the equivalents thereof.

What is claimed is:

1. A rotor position estimating device comprising:
    a voltage application unit configured to apply a d-axis voltage to an electric motor including a salient-pole rotor during a stop of the electric motor;
    a current detecting unit configured to detect a q-axis current flowing through the electric motor at the time when the d-axis voltage is applied; and
    an estimating unit configured to estimate a rotor position during a stop of the electric motor on the basis of the q-axis current detected by the current detecting unit, wherein
    the voltage application unit is configured to set a voltage application time in correspondence with peak timing at which the q-axis current reaches a peak in a transitional response characteristic of the q-axis current at the time when the d-axis voltage is applied.

2. The rotor position estimating device according to claim 1, wherein
    the voltage application unit is configured to set the voltage application time such that the peak timing becomes timing at which the voltage application time ends, and
    the current detecting unit is configured to detect the q-axis current at the timing at which the voltage application time ends.

3. The rotor position estimating device according to claim 1, wherein
    the voltage application unit is configured to apply the d-axis voltage at each of rotation angles of d-q axes set as a rotating coordinate system of the electric motor while the d-q axes are being rotated at intervals of predetermined angle, and
    the estimating unit is configured to estimate a rotor position corresponding to the d-q axes, at which a detected value of the q-axis current at the time when the d-axis voltage is applied at each of the rotation angles is closest to zero, as the rotor position during a stop of the electric motor.

4. The rotor position estimating device according to claim 1, further comprising:
    an inverter configured to control a voltage that is applied to the electric motor through switching operation in accordance with a control signal that is generated on the basis of a command value and a carrier wave; and
    an adjustment unit configured to adjust a frequency of the carrier wave such that the voltage application time becomes a time that is the integral multiple of half of a period of the carrier wave, wherein
    the voltage application unit is configured to control switching operation of the inverter such that application of the d-axis voltage to the electric motor is started at timing at which the carrier wave reaches a vertex, and
    the current detecting unit is configured to detect the q-axis current by sampling the q-axis current at the timing at which the carrier wave reaches a vertex.

5. An electric motor control system that controls an electric motor including a salient-pole rotor, the electric motor control system comprising:
    a rotation position detecting device configured to detect a rotor position of the electric motor;
    a rotor position estimating device configured to estimate the rotor position of the electric motor during a stop of the electric motor;
    an error detecting device configured to detect an error between a detected value of the rotor position and an estimated value of the rotor position, wherein the detected value is detected by the rotation position detecting device, and wherein the estimated value of the rotor position is estimated by the rotor position estimating device;

a correcting device configured to correct the rotor position that is detected by the rotation position detecting device using the error detected by the error detecting device; and an energization control device configured to execute energization control over the electric motor on the basis of the rotor position corrected by the correcting device, wherein the rotor position estimating device includes a voltage application unit configured to apply a d-axis voltage to the electric motor during a stop of the electric motor, a current detecting unit configured to detect a q-axis current flowing through the electric motor at the time when the d-axis voltage is applied and an estimating unit configured to estimate the rotor position during a stop of the electric motor on the basis of the q-axis current detected by the current detecting unit, and the voltage application unit is configured to set a voltage application time in correspondence with peak timing at which the q-axis current reaches a peak in a transitional response characteristic of the q-axis current at the time when the d-axis voltage is applied.

6. A rotor position estimating method comprising:

applying a d-axis voltage to an electric motor including a salient-pole rotor during a stop of the electric motor;

detecting a q-axis current flowing through the electric motor at the time when the d-axis voltage is applied; and estimating a rotor position during a stop of the electric motor on the basis of the detected q-axis current, wherein a voltage application time is set in correspondence with peak timing at which the q-axis current reaches a peak in a transitional response characteristic of the q-axis current at the time when the d-axis voltage is applied.

7. The rotor position estimating method according to claim 6, wherein the voltage application time is set such that the peak timing becomes timing at which the voltage application time ends, and the q-axis current is detected at the timing at which the voltage application time ends.

8. The rotor position estimating method according to claim 6, wherein the d-axis voltage is applied at each of rotation angles of d-q axes set as a rotating coordinate system of the electric motor while the d-q axes are being rotated at intervals of predetermined angle, and a rotor position corresponding to the d-q axes, at which a detected value of the q-axis current at the time when the d-axis voltage is applied at each of the rotation angles is closest to zero, is estimated as the rotor position during a stop of the electric motor.

9. The rotor position estimating method according to claim 6, further comprising:

controlling a voltage that is applied to the electric motor through switching control over an inverter in accordance with a control signal that is generated on the basis of a command value and a carrier wave, wherein the inverter is subjected to switching control such that application of the d-axis voltage to the electric motor is started at timing at which the carrier wave reaches a vertex, the q-axis current is detected by sampling the q-axis current at the timing at which the carrier wave reaches a vertex, and a frequency of the carrier wave is adjusted such that the voltage application time becomes a time that is the integral multiple of half of a period of the carrier wave.

\* \* \* \* \*